(12) United States Patent
Paramore et al.

(10) Patent No.: US 11,624,105 B2
(45) Date of Patent: *Apr. 11, 2023

(54) THERMO-HYDROGEN REFINEMENT OF MICROSTRUCTURE OF TITANIUM MATERIALS

(71) Applicant: University of Utah Research Foundation, Salt Lake City, UT (US)

(72) Inventors: James D. Paramore, Salt Lake City, UT (US); Brady G. Butler, Salt Lake City, UT (US); Matthew K Dunstan, Salt Lake City, UT (US); Jonathan P. Ligda, Salt Lake City, UT (US); Zhigang Z. Fang, Salt Lake City, UT (US)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/485,882

(22) Filed: Sep. 27, 2021

(65) Prior Publication Data

US 2022/0056569 A1 Feb. 24, 2022

Related U.S. Application Data

(63) Continuation-in-part of application No. 17/177,039, filed on Feb. 16, 2021, which is a continuation of application No. 16/154,536, filed on Oct. 8, 2018, now Pat. No. 10,920,307.

(60) Provisional application No. 62/569,294, filed on Oct. 6, 2017.

(51) Int. Cl.
C22F 1/18 (2006.01)
C22C 14/00 (2006.01)
C22F 1/02 (2006.01)

(52) U.S. Cl.
CPC ............... *C22F 1/183* (2013.01); *C22F 1/02* (2013.01)

(58) Field of Classification Search
CPC .................................. C22C 14/00; C22F 1/183
See application file for complete search history.

(56) References Cited

U.S. PATENT DOCUMENTS 10,920,307 B2 * 2/2021 Paramore ................ C22F 1/183

* cited by examiner

*Primary Examiner* — Jessee R Roe
(74) *Attorney, Agent, or Firm* — Thorpe North and Western LLP; Erik S. Ericksen

(57) ABSTRACT

A method of refining a microstructure of a titanium material can include providing a solid titanium material at a temperature below about 400° C. The titanium material can be heated under a hydrogen-containing atmosphere to a hydrogen charging temperature that is above a β transus temperature of the titanium material and below a melting temperature of the titanium material, and held at this temperature for a time sufficient to convert the titanium material to a substantially homogeneous β phase. The titanium material can be cooled under the hydrogen-containing atmosphere to a phase transformation temperature below the β transus temperature and above about 400° C., and held for a time to produce α phase regions. The titanium material can also be held under a substantially hydrogen-free atmosphere or vacuum at a dehydrogenation temperature below the β transus temperature and above the δ phase decomposition temperature to remove hydrogen from the titanium material.

14 Claims, 4 Drawing Sheets

THERMO-HYDROGEN REFINEMENT OF MICROSTRUCTURE OF TITANIUM MATERIALS

RELATED APPLICATIONS

This application is a continuation-in-part of U.S. application Ser. No. 17/177,039, filed Feb. 16, 2021, now abandoned, which is a continuation of U.S. application Ser. No. 16/154,536, filed Oct. 8, 2018, now U.S. Pat. No. 10,930,207, which claims priority to U.S. Provisional Application No. 62/569,294, filed Oct. 6, 2017, which are incorporated herein by reference.

BACKGROUND

Titanium alloys can have high specific strength, excellent corrosion resistance, and great biocompatibility. Due to these properties, titanium alloys may have profound implications for sustainability if made economical for widespread commercial utilization. Wider use of these materials can significantly improve energy efficiency in applications such as the automotive industry and power generation by reducing the weight of high-strength components. Making these components from titanium materials can also provide significantly increased service life. However, the traditional processes for making high-performance titanium materials, such as wrought processing, are highly energy-intensive, making these materials unfeasible for most commercial applications outside of aerospace and biomedicine. Furthermore, the mill products produced by wrought processing can only be made in simple geometries, such as plate, sheet, and bar stock. Therefore, producing end-user components typically requires extensive machining, forming, joining, etc., which further increase the embodied energy by increasing the amount of energy required for production and limiting overall yield through material losses.

Near-net-shape production technologies, such as casting and additive manufacturing (AM, e.g. 3D printing), have been identified as a means to significantly improve the economics of using titanium alloys for a wide variety of applications. Such processes avoid the energy-intensive thermomechanical processing (TMP) employed by wrought processing. Additionally, these technologies can directly produce complex geometries, which allows for significant reduction in the amount of subsequent machining, forming, joining, etc., required. Furthermore, AM has many more benefits in regards to rapid prototyping and direct digital manufacturing. However, despite these benefits, using many near-net-shape technologies significantly compromises the resulting mechanical performance of the titanium alloy components.

For the most common $\alpha+\beta$ titanium alloy (i.e. Ti-6Al-4V), casting and electron beam AM (e.g. electron beam melting, etc.) can produce a coarse lamellar microstructure with limited strength and poor fatigue performance. Conversely, laser AM (e.g. direct metal laser sintering, selective laser melting, etc.) can produce a highly acicular/martensitic microstructure with poor ductility and highly anisotropic mechanical properties. As aforementioned, TMP is the traditional route for engineering titanium alloy microstructures and producing high performance mechanical properties. However, utilizing TMP would both increase the embodied energy of the material and, more importantly, sacrifice the near-net-shape capability of these technologies. Therefore, there has long been a need for a process that can refine the microstructure of titanium alloys in an energy efficient manner and without requiring any deformation.

SUMMARY

The present invention involves methods of refining the microstructure of titanium materials. In one example, a method of refining a microstructure of a titanium material can include providing a solid titanium material at a temperature below about 400° C. The titanium material can be heated under a hydrogen-containing atmosphere to a hydrogen charging temperature. The hydrogen charging temperature can be above a $\beta$ transus temperature of the titanium material and below a melting temperature of the titanium material. For all titanium materials, the $\beta$ transus temperature can change with hydrogen content, which can be considered when determining the appropriate hydrogen charging temperature. The titanium material can be held at this temperature for a hydrogen charging time sufficient to convert the titanium material to a substantially homogeneous $\beta$ phase titanium material. The method can also include cooling the titanium material under the hydrogen-containing atmosphere to a phase transformation temperature. The phase transformation temperature can be below the 0 transus temperature and above about 400° C. The titanium material can be held at the phase transformation temperature for a phase transformation time to produce regions of the lower temperature $\alpha$, $\alpha_2$, and in some cases $\delta$ phases. Further, the method can include holding the titanium material under a substantially hydrogen-free atmosphere or vacuum at a dehydrogenation temperature to form a dehydrogenated titanium material. The dehydrogenation temperature can be below the $\beta$ transus temperature of the hydrogen-free titanium material and above the decomposition temperature of the $\delta$ phase, about 200° C. for some alloys. This can remove at least a portion of hydrogen from the titanium material.

The present technology also extends to titanium materials having refined microstructures that can be made through the processes described herein. In one example, a titanium material can have a microstructure including prior $\beta$ grains with an average diameter ranging from about 50 μm to over 1000 μm that form at the hydrogen charging temperature. Within the boundaries of the prior $\beta$ grains, the titanium material can have ultrafine lamellar $\alpha$ grains with average lengths ranging from 5 μm to 8 μm and average widths ranging from 0.1 μm to 2 μm. Further, these a grains can be arranged into colonies that have average lengths ranging from 5 μm to 8 μm and average widths ranging from 1 to 4 μm. The material can also have a layer of $\alpha$ grains with average widths of 2 μm to 6 μm along the boundaries the prior $\beta$ grains. Thus, in some examples, prior $\beta$ grains can be 10 to 400 times, and in some cases up to 200 times larger than $\alpha$ grain colonies. Similarly, $\alpha$ grain widths of grain boundary $\alpha$ grains can be within 50%, and often within 10% of an average diameter of the $\alpha$ grain colony.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
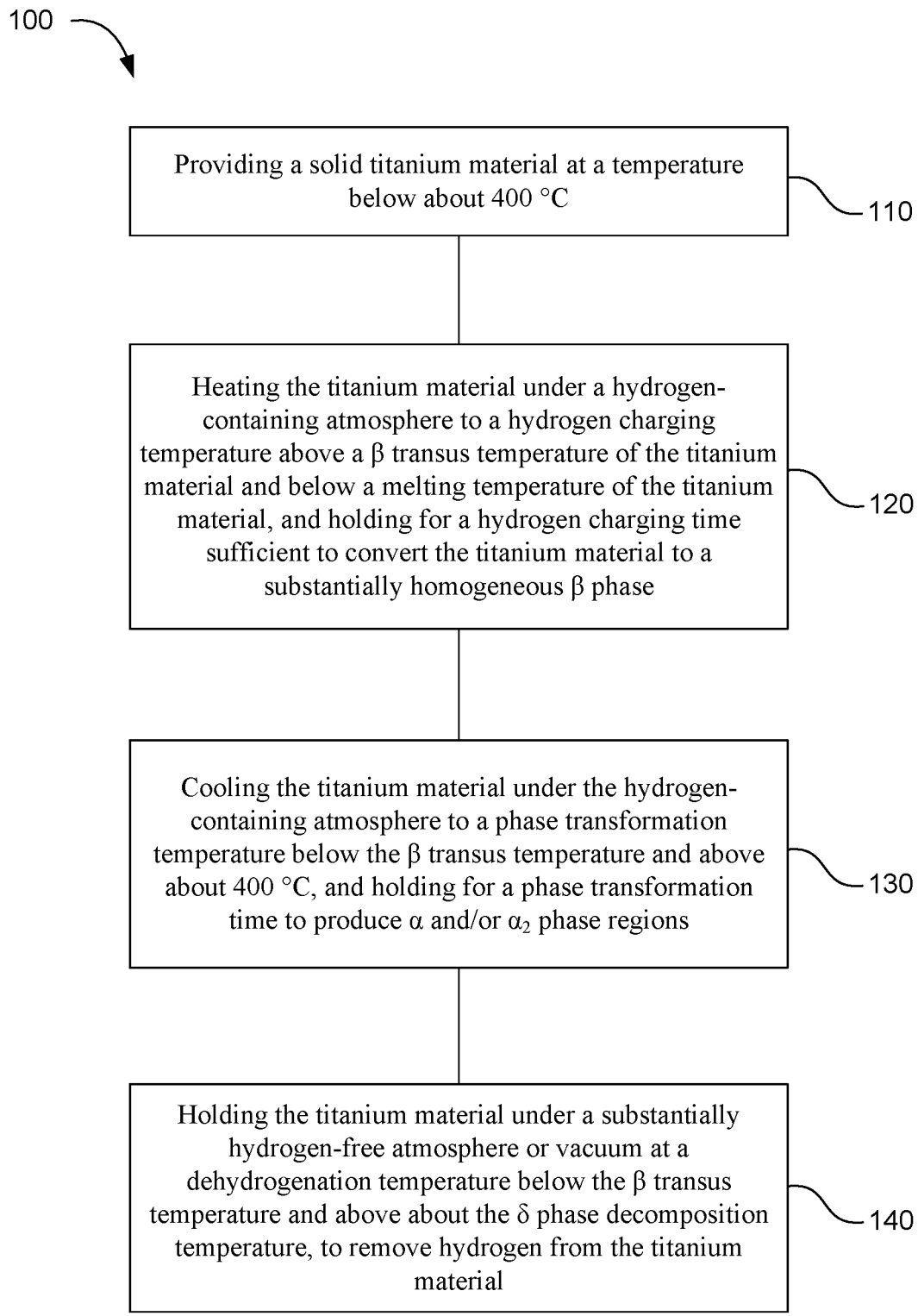
FIG. 1 is a flowchart of an example method of refining a microstructure of a titanium material.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

As used herein, "titanium material" can include titanium metal and alloys of titanium with other elements. In certain non-limiting specific examples, the titanium material can be commercially pure (CP) titanium metal, Ti-6Al-4V, Ti-6Al-6V-2Sn, Ti-0.3Mo-0.8N, Ti-3Al-2.5V, Ti-5Al-2.5Sn, Ti-0.15Pd, Ti-3Al-8V-6Cr-4Mo-4Zr, and the like. The Ti-6Al-4V alloy refers to an alloy that consists essentially of about 6 wt % aluminum, about 4 wt % vanadium, and the remainder being titanium. These proportions are approximate and in some examples the amounts can vary. For example, the amount of aluminum can be from 5.5 wt % to 6.75 wt % in some examples. The amount of vanadium can be from 3.5 wt % to 4.5 wt % in further examples. The alloy can also include impurities of small amounts of other elements, such as iron, oxygen, carbon, nitrogen, hydrogen, yttrium, and others. Similarly, commercially pure titanium (CP—Ti) can generally be at least 99.2 wt % titanium. In some examples, the starting material for the methods described herein can be a solid titanium material. In many examples, the starting titanium material can be a solid article formed by any suitable process. The solid titanium material can be obtained through any suitable manufacturing method. In certain examples, the solid titanium material can be a titanium part formed by 3D printing or casting. In some cases, the solid article can be a prior sintered article.

As used herein, "fine and ultrafine" refer to grain sizes which range from about 5 µm to about 20 µm for fine grains, and less than 1 µm to about 5 µm for ultrafine grains. Most often individual grains sizes can be about 0.1 µm to about 8 µm in any dimension.

As used herein, the terms "dynamically controlled hydrogen atmosphere" or "dynamically controlled hydrogen partial pressure" are used to mean that the hydrogen partial pressure can be held constant or varied as a function of time during each step in the thermal cycle. In any embodiment, hydrogen partial pressure can be dynamically controlled as a function of time and temperature in order to precisely control the microstructure of the titanium material. In particular, the hydrogen partial pressure can be controlled during the hydrogen charging and the phase transformation stages of the methods described herein. The hydrogen partial pressure can be controlled by the addition or removal of hydrogen from the atmosphere using mass flow controllers or pressure controllers. The partial pressure of hydrogen during the hydrogen charging and phase transformation can be greater than 0.01 atmosphere, and in some cases greater than 1 atmosphere. The degree of grain refinement due to phase transformations can result from the changing phase equilibria between $\alpha$, $\alpha_2$, $\beta$, and $\delta$ phases of titanium and titanium alloys during processing. These phase equilibria can change with temperature and with equilibrium hydrogen concentration, which varies as a function of temperature and hydrogen partial pressure. Therefore, by dynamically controlling partial pressure of hydrogen as well as temperature, phase evolution and, therefore, microstructure can be precisely controlled at each step of the process. The dynamically controlled hydrogen atmosphere can have partial pressures of hydrogen between 0.01 atm and 10 atm, which are achieved by a mixture of hydrogen and an inert gas at approximately 1 atm to 10 atm total pressure, pure hydrogen at pressures approximately between 0.01 atm and 10 atm, or a fixed mixture of hydrogen and inert gas at pressures between 0.01 and 20 atm. Therefore, partial pressure of hydrogen can be dynamically controlled by dynamically varying the gas ratio in the former example, or the absolute system pressure in the latter two. The partial pressure of hydrogen can be controlled independently of any hydrogen that may be produced from the evolution of hydrogen gas from hydrogenated titanium. Different hydrogen partial pressure profiles can be used to tailor the mechanical properties of the as-treated material by controlling the as-treated microstructure.

As used herein, the term $\alpha$ phase refers to a hexagonal close-packed (HCP) solid solution of titanium with alloying elements. The $\alpha$ phase may or may not contain some hydrogen. The term $\beta$ phase refers to a body-centered cubic (BCC) titanium solid solution with alloying elements, which may or may not also contain hydrogen. The term $\delta$ phase refers to a face-centered cubic (FCC) hydrogenated titanium or titanium hydride, $TiH_x$, where x varies from 1.5 to 2, at room temperature. The term $\alpha_2$ refers to $Ti_3Al$ phase which is an ordered hexagonal structure in $\alpha$ phase with DO19 crystal structure. The definitions of the phases are further illustrated by the phase diagrams of Ti—H (ASM Handbook, Vol. 3, p. 238, 1992), and (Ti-6Al-4V)—H (Pei Sun et al., "An experimental study of the (Ti-6Al-4V)-xH phase diagram using in situ synchrotron XRD and TGA/DSC techniques", Acta Materialia, Vol. 84, pp. 29-41, 2015). It should be noted that the phase diagrams of titanium alloys with hydrogen vary considerably within the scientific literature and are not yet completely characterized. Therefore, the exact temperatures and time of hydrogen charging, isothermal holding for phase transformation, and dehydrogenation will all vary accordingly. For example, it is noteworthy that β transus temperatures vary as a function of hydrogen content (e.g. typically falling with increases in hydrogen content).

As used herein, "globularized microstructure" can be defined as microstructure in which a majority of the material is composed of primary α ($α_p$) grains that each have an aspect ratio of typically less than 3:1 and β phase present primarily at the triple point of the $α_p$ grains.

As used herein, a "bi-modal microstructure" can be defined as microstructure in which a majority of the material is composed of a mixture of two types of microstructure: the first type is $α_p$ grains that have a low aspect ratio of typically less than 3:1 and the second type is colonies of lamellar α grains with retained β phase. The volume fraction of either microstructure type in a bi-modal microstructure can vary from 5% to 95%, which depends on the maximum temperature and cooling rate used during the heat treatment.

As used herein, a "grain colony" is a lamellar structure generally having from two to about ten parallel laminar grains. Typically, the laminar grains are α and $α_2$ grains.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, the term "at least one of" is intended to be synonymous with "one or more of." For example, "at least one of A, B and C" explicitly includes only A, only B, only C, and combinations of each.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally, the phrase "consisting essentially of" will be understood to include those elements specifically recited and those additional elements that do not materially affect the basic and novel characteristics of the claimed invention. The phrase "consisting of" excludes any element not specifically specified.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Thermo-Hydrogen Refinement of Microstructure of Titanium Materials

Methods are provided for refining the microstructure of titanium materials. Previous progress in titanium material processing has been made in the particular area of powder metallurgy using the hydrogen sintering and phase transformation (HSPT) process. This process is described in previously-filed U.S. patent application Ser. No. 14/152,787 (U.S. Patent Application Publication No. 2014/0255240). The HSPT process is a powder metallurgy process that has proven successful at producing α+β titanium alloys (e.g. Ti-6Al-4V) with wrought-like microstructures by utilizing hydrogen-induced phase transformations during the sintering process.

In contrast with the HSPT process, the revised methods described herein can be used to refine the microstructure of titanium starting materials in any form, not limited to powder metallurgy sintering processes, and particularly to already formed titanium articles. For example, the methods described herein can be used to treat individual titanium powder particles, titanium material that has already been sintered, titanium material produced by casting, titanium material produced by additive manufacturing, titanium materials produced by machining, or any other bulk, solid titanium material. As used herein, "individual titanium powders" refers to loose titanium powders and does not include un-sintered green bodies of powders made up of separate powder particles. Furthermore, as used herein, "solid titanium material" refers to a bulk material that is consolidated into a single mass. Accordingly, an un-sintered green body made up of separate powder particles is not considered a solid titanium material.

Certain types of microstructures are desirable in titanium products because of their strength, ductility, and other mechanical properties. For example, globularized grains or bi-modal microstructures are two types of microstructures that are often sought in traditional titanium processing. In order to create these desirable globularized and bi-modal microstructures, traditional titanium processing utilizes significant deformation of the material to allow recrystallization to occur during the heat treatment. This traditional method is wrought processing, which utilizes thermomechanical processing (TMP). TMP uses both mechanical working and heat treatments, as the mechanical deformation drives recrystallization during the subsequent heat treatment. TMP is very energy-intensive and, therefore, costly. Furthermore, the deformation required during TMP means it is not feasible for use with near-net-shape production techniques, such as additive manufacturing or casting. Conversely, the ultrafine size of the $\alpha$ colonies and the finely dispersed $\beta$ phase that can result after methods described herein can allow for globularized and bi-modal microstructures to be produced without recrystallization. These microstructures can result from coalescence of the $\alpha$ colonies into fine globularized $\alpha$ grains and the coarsening and transformation of the finely dispersed $\beta$ grains. As such, the methods described herein can be very cost effective for producing traditional wrought-like microstructures and high performance properties without sacrificing the near-net-shape capabilities of manufacturing processes such as additive manufacturing and casting. The methods described herein can also produce several new microstructures that are not obtainable by traditional methods.

Titanium alloys produced using additive manufacturing (AM) technologies tend to have highly anisotropic microstructures due to the uncommon thermal histories that are produced during these manufacturing processes. This, in turn, results in highly anisotropic properties with particularly limited ductility in certain directions. The methods described herein can "reset" the microstructure of titanium material produced through additive manufacturing to eliminate these limitations. Additionally, while the methods described herein are particularly well-suited to additive manufacturing, the methods can also be used on any bulk titanium product using the current heat treatment. Therefore, the methods can be used to improve the microstructure and properties of titanium alloys produced by traditional techniques such as casting, which is also near-net-shape, or even wrought processing.

In various examples, the solid titanium material used as the starting material for the methods described herein can be titanium or a titanium alloy. In further examples, the material can be titanium or a titanium alloy that is free or substantially free of hydrogen. Titanium alloys can be made by alloying titanium metal with additional elements. Non-limiting examples of elements that can be included in titanium alloys include molybdenum, vanadium, niobium, tantalum, zirconium, manganese, iron, chromium, cobalt, nickel, copper, aluminum, tin, silicon, gallium, germanium, carbon, oxygen, and nitrogen. In particular examples, the titanium material can be commercially pure (CP) titanium metal or Ti-6Al-4V alloy. The Ti-6Al-4V alloy refers to an alloy that consists essentially of about 6 wt % aluminum, about 4 wt % vanadium, and the remainder being titanium. These proportions are approximate and in some examples the amounts can vary. For example, the amount of aluminum can be from 5.5 wt % to 6.75 wt % in some examples. The amount of vanadium can be from 3.5 wt % to 4.5 wt % in further examples. The alloy can also include impurities of small amounts of other elements, such as iron, oxygen, carbon, nitrogen, hydrogen, yttrium, and others. Commercially pure titanium refers to titanium that is at least 99.2% pure by weight. Impurities in commercially pure titanium can include oxygen and small amounts of other elements. In certain examples, any of the methods described herein, including specific temperature ranges and holding times, can be used specifically with Ti-6Al-4V alloy.

In some examples, the solid titanium material can be made using additive manufacturing, sometimes referred to as 3D printing. Various methods of additive manufacturing have been developed and some methods are now in development. Some non-limiting examples of titanium additive manufacturing include selective laser melting (SLM), direct metal laser sintering (DMLS), powder spray printing followed by sintering, binder jetting followed by sintering, fused filament fabrication followed by sintering, and others.

Titanium parts produced by additive manufacturing can sometime have less than optimal material properties, such as ductility. However, the methods for refining microstructure provided herein can increase the ductility of 3D printed titanium parts. In one example, a component made of Ti-6Al-4V alloy by selective laser melting exhibited a 300% increase in ductility when the method described herein was used to refine the microstructure of the component. The methods described herein can increase ductility and fatigue strength by creating wrought-like microstructures without wrought processing. The methods utilize hydrogen-enabled phase transformations to create an ultrafine-grained microstructure that can be further engineered with heat treatments.

In some examples, methods of refining the microstructure of titanium material can include heating the material under a hydrogen-containing atmosphere to a temperature above the $\beta$ transus temperature of the titanium material to increase the hydrogen concentration in the material and convert the material to a substantially homogeneous $\beta$ phase. This can be referred to as "hydrogen charging." The titanium material can then be cooled to a temperature below the $\beta$ transus temperature and held under the hydrogen-containing atmosphere for a period of time to produce an ultrafine-grained microstructure made up of multiple phases that can include $\alpha$, $\alpha_2$, $\beta$, and $\delta$-TiH$_2$ phases. This can be referred to as "phase transformation." The titanium material can then be held under a hydrogen-free atmosphere or vacuum at a temperature below the $\beta$ transus temperature to remove hydrogen from the material. This can be referred to as "dehydrogenation." This can result in an ultrafine-grained microstructure of $\alpha$ and $\beta$ phases. This material can be used after dehydrogenation, or the microstructure can be further engineered using a heat treating and/or aging process.

With this description in mind, FIG. 1 is a flowchart illustrating an example method 100 of refining a microstructure of a titanium material. The method includes: providing 110 a solid titanium material at a temperature below about 400° C.; heating 120 the titanium material under a hydrogen-containing atmosphere to a hydrogen charging temperature above a β transus temperature of the titanium material and below a melting temperature of the titanium material, and holding for a hydrogen charging time sufficient to convert the titanium material to a substantially homogeneous β phase; cooling 130 the titanium material under the hydrogen-containing atmosphere to a phase transformation temperature below the β transus temperature and above about 400° C., and holding for a phase transformation time to produce α phase regions; and holding 140 the titanium material under a substantially hydrogen-free atmosphere or vacuum at a dehydrogenation temperature below the β transus temperature and above about the δ decomposition temperature, to remove hydrogen from the titanium material.

Figure 2:
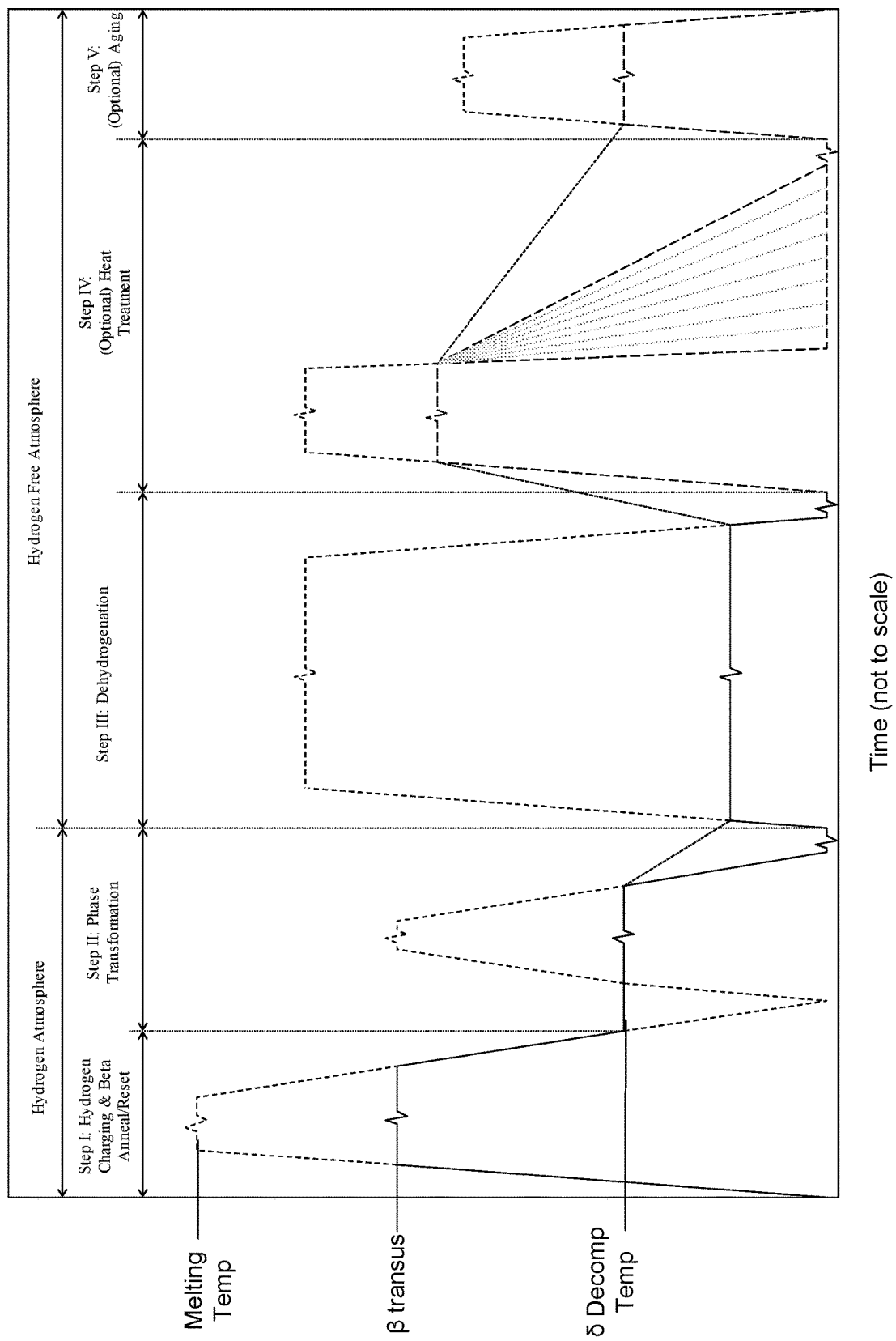
FIG. 2 is a graph of temperature vs. time for another example method of refining a microstructure of a titanium material.

To illustrate the methods graphically, FIG. 2 is a graph of temperature over time for another example method of refining a microstructure of a titanium material. In this method, the solid titanium material starts at room temperature and is heated under a hydrogen atmosphere. The material is held at a hydrogen charging temperature. In this particular example, the hydrogen charging temperature can be from about 825° C. (shown by the solid line) to about 1605° C. (shown by the dashed line). Throughout the graph in FIG. 2, the dotted lines represent maximum temperatures in each stage of the process and the solid lines represent minimum temperatures. It should be noted that this graph is only one example of the methods described herein. The temperatures used in this example are designed for use with Ti-6Al-4V alloy specifically. In other examples, the method may have different minimum and maximum temperatures, especially when different titanium materials are used. For example, when titanium materials with fewer β stabilizing alloying elements are used, such as Ti-3Al-2.5V, it may be beneficial to use higher temperature ranges to accommodate for the higher β transus temperatures. Furthermore, if a titanium materials with more β stabilizing alloying elements are used, such as Ti-6Al-2Sn-4Zr-6Mo, it may be beneficial to use lower temperature ranges to accommodate for the lower β transus temperatures. It should also be noted that for any titanium material the β transus temperature will vary with respect to the instantaneous and local hydrogen concentrations within the material, and the degree by which the β transus varies and, therefore, by which nominal heat treatment temperature ranges vary will also be affected by the alloying elements present in the titanium material used.

During the hydrogen charging in the example of FIG. 2, the titanium material is converted to a substantially homogeneous β phase. During hydrogen charging, β phase grains can be either maintained or grown. For example, with laser 3D printed titanium materials grains size tends to be sufficiently small that relatively lower temperatures are sufficient to reset the microstructure. In contrast, cast and electron beam 3D printed articles tend to have larger prior β phase grains such that a higher temperature can be desirable to fully eliminate prior phase structure of the original article.

The titanium material is then cooled to a phase transformation temperature. The β phase titanium material can optionally be first cooled to room temperature and reheated, or directly cooled to the phase transformation temperature. The phase transformation temperature in this example is from about 400° C. to about 825° C. The material is held at this temperature under the hydrogen atmosphere to convert regions of the β phase to an α phase, including α phase and/or $\alpha_2$ phase. Typically, the α phase and/or $\alpha_2$ phase forms homogenously within the prior β grains, thereby significantly refining the microstructure. The phase transformation temperature can also be controlled to avoid substantial growth of α and/or $\alpha_2$ phase grains or to prevent the formation of δ phase, all of which will depend on the partial pressure of hydrogen in the atmosphere during phase transformation. Optionally, initially cooling to room temperature can force the formation of low temperature α, $\alpha_2$ and δ phases, which can first form at the surface of the material, which, in turn, may result in a microstructural gradient before the phase transformation step.

At this point, the hydrogen atmosphere is replaced with an inert atmosphere or vacuum. The material is then held at a dehydrogenation temperature to remove hydrogen from the material. The titanium material may be optionally cooled to room temperature before dehydrogenation or directly heated or cooled to the dehydrogenation temperature. The minimum dehydrogenation temperature in the example of FIG. 2 is 500° C. and the maximum is the β transus (approximately 995° C. for hydrogen-free Ti-6Al-4V). Alternatively, the minimum dehydrogenation temperature can be as low as 200° C. At lower temperatures, microstructure formed in the phase transformation stage can be preserved while relatively higher temperatures tend to coarsen the microstructure. In certain examples, the titanium material can be used immediately after dehydrogenation. However, the example method shown in FIG. 2 also includes heat treatment and aging after the dehydrogenation. Heat treatment is performed by holding the material under the inert atmosphere or vacuum at a heat treatment temperature. The titanium material may be optionally cooled to room temperature before heat treatment or directly heated or cooled to the heat treatment temperature. The heat treatment temperature in this example can be from about 750° C. to about 995° C. The material can be cooled at a variety of cooling rates, as shown by the multiple slanted lines after the heat treatment stage in FIG. 2. Different cooling rates can produce different microstructures. As a general rule, faster cooling rates tend to form a bi modal microstructure where β phase forms acicular or lamellar α phase while globular $\alpha_p$ phase that was formed during the hold at the heat treatment temperature remains. Conversely, slower cooling rates tend to form globular $\alpha_p$ grains of most of the microstructure with β phase retained largely at the triple pointes of the $\alpha_p$ grains.

After cooling, the material can optionally cooled to room temperature and heated up to an aging temperature. Alternately, the temperature can be ramped down directly from the heat treatment temperature to the aging temperature. The material can be held at the aging temperature to further refine the microstructure. In this example, the aging temperature can be from about 400° C. to about 700° C. By aging, the titanium material experiences precipitation of secondary α and/or $\alpha_2$ phase, which can increase the strength of the material.

It should be noted that the graph in FIG. 2 shows temperature with respect to time, but the time axis is not necessarily drawn to scale. Each of the horizontal lines at each hold temperature is shown with a line break, indicating that the time for holding the material at that hold temperature can be different than the time shown on the graph. Accordingly, hold times that appear longer on the graph may actually be shorter in some examples. Similarly, although cooling to room temperature can be performed between each stage, such cooling is not required and may simply be cooled or heated directly to the next stage temperature.

Figure 3:
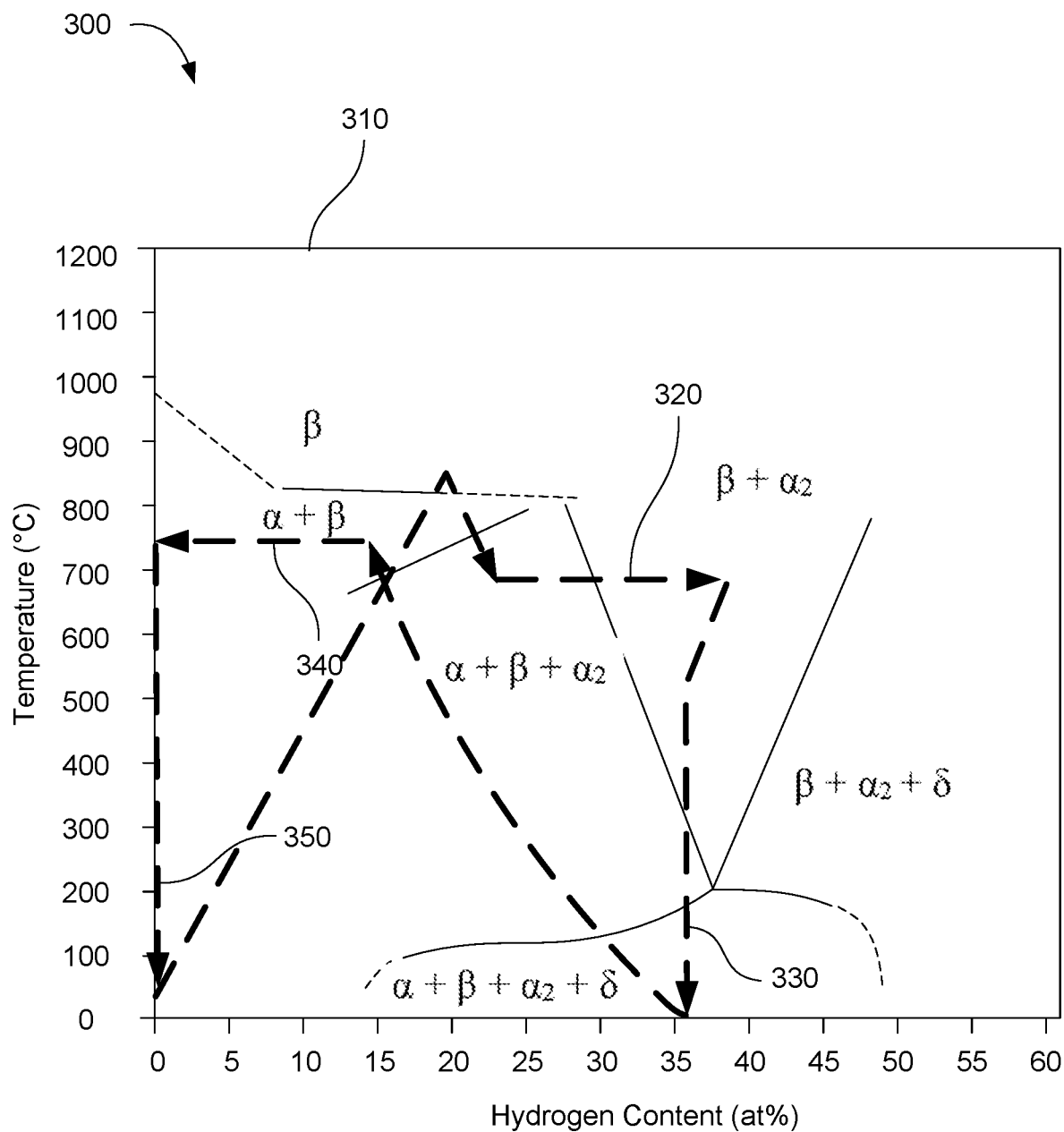
FIG. 3 is a phase diagram in terms of temperature vs. hydrogen content also showing stages in another example method of refining a microstructure of a titanium material.

FIG. 3 shows another example method 300 of refining the microstructure of a titanium material. This example is shown in the form of a phase diagram for a titanium material with varying amounts of hydrogen at varying temperature. The vertical axis shows temperature in ° C. and the horizontal axis shows the hydrogen content in atom percent. The temperature and hydrogen content of the titanium material are shown by bold dashed arrows. Thin solid or dashed lines are used to show the boundaries between different phase regions of the phase diagram, and the particular material phases present in each region are written, such as "β" and "α+β." In this example, the titanium material starts with 0% hydrogen (or at least less than about 0.02%) at room temperature and then is heated to a hydrogen charging temperature 310 under a hydrogen atmosphere. The average hydrogen content of the titanium material may increase during the hydrogen charging step. Then, the material is cooled under the hydrogen atmosphere to a phase transformation temperature 320. The hydrogen content of the material continues to increase during this stage. At this point the titanium material can form portions of α and $\alpha_2$ phase in addition to the β phase. The material is cooled 330 to room temperature. As mentioned above, although the material can optionally be cooled to room temperature between some of the stages in the process, in other examples the material can be ramped to the next hold temperature without cooling to room temperature. Next, the titanium material is heated to a dehydrogenation temperature 340 under a hydrogen-free atmosphere or vacuum. The hydrogen content decreases to less than 0.0125%. Then, the titanium material is finally cooled 350 to room temperature.

In more detail, the methods of refining microstructures of titanium materials can begin with providing a solid titanium material at a temperature below about 400° C. In some examples, the solid titanium material can be at room temperature. In further examples, the solid titanium material can be free of or substantially free of hydrogen. As mentioned above, the solid titanium material can be prepared by any suitable process, including sintering, casting, additive manufacturing, machining, and so on. If the solid titanium material is prepared using a high-temperature process such as sintering, the solid titanium material can be cooled to a temperature below about 400° C. before beginning the methods described herein.

After the solid titanium material has been provided, the solid titanium material can be heated to a hydrogen charging temperature under a hydrogen-containing atmosphere. As mentioned above, the hydrogen-containing atmosphere can include a partial pressure of hydrogen gas that can be controlled. In some examples, the atmosphere can consist of or consist essentially of hydrogen gas at a desired pressure. In other examples, the atmosphere can include hydrogen mixed with an inert gas such as argon. In certain examples, an atmosphere of half hydrogen and half argon, with respect to partial pressures, can be used.

The hydrogen charging temperature can be above the β transus temperature and below the melting temperature of the solid titanium material. Accordingly, the hydrogen charging temperature can vary depending on the melting temperature of the particular titanium alloy. The β transus temperature is the temperature at which the material can entirely transform into homogenous β phase. A "homogeneous β phase" refers to a material having greater than 99% β phase, by volume, with non-β phase material confined to the grain boundaries and triple points of the β grains. The β transus temperature can vary with the hydrogen content of the titanium material. For example, the β transus temperature can decrease as the hydrogen content increases from 0% to a higher content. While the titanium material is held at the hydrogen charging temperature, hydrogen can dissolve in the entire volume of the titanium material and the material can be converted to a homogeneous β phase.

In certain examples, the solid titanium material can be a sintered material having a density of 96% or greater. In some cases, the density of such a sintered material can be increased during the hydrogen charging stage. In some examples, the density can increase to 98% or greater, 99% or greater, or 100%. In such examples, using a higher hydrogen charging temperature can help to further densify the sintered material. In further examples, for non-sintered materials the hydrogen charging stage can help to remove any porosity or other defects that may be in the material. In certain examples, the hydrogen charging temperature can be from about 1200° C. to about 1605° C. In other examples, the hydrogen charging temperature can be from about 825° C. to about 1605° C. or from 825° C. to 1200° C.

The hold time for hydrogen charging, phase transformation, and dehydrogenation can each vary depending on the size of the titanium material being processed and in particular a diffusion length from a surface of the material to a maximum depth from a nearest surface). As a general rule, materials having a greater diffusion length require a longer hold time for a given temperature. Utilizing lower temperatures can significantly increase hold time while higher temperatures may greatly decrease hold time. Additionally, atmospheric factors such as vacuum pumping speed, hydrogen partial pressure in vacuum, ultimate vacuum level (if using vacuum), inert gas flow rate, inert gas purity, and the like can also affect hold times desirable to achieve hydrogen charging, phase transformation, and/or dehydrogenation. Therefore, as one example, hydrogen content can be checked by inert gas fusion techniques in accordance to industry standards (e.g. ASTM 1409) in order to assess degree of completion for one or both of hydrogen charging and dehydrogenation stages.

In some examples, the hydrogen charging hold time can be from about 1 minute to about 24 hours for diffusion lengths up to about 1.5 inches. In further examples, the hold time can be from about 1 hour to about 4 hours for much smaller parts and shorter diffusion lengths (e.g. less than about 1 inch). In still further examples, the hold time can be from about 5 minutes to about 1 hour for yet shorter diffusion lengths (e.g. less than about 0.5 inch). For diffusion lengths less than 1.5 inches hydrogen charging hold times up to 10 days can be expected when using a temperature of 750° C. For diffusion lengths greater than 1.5 in, hydrogen charging hold times of 1-30 days can be expected when using a temperature of 750° C. Diffusion lengths up to about 3-4 inches and in some cases from greater than 1.5 inches to 4 inches can be refined.

The hold time can be sufficient to allow substantially the entire titanium material to be converted to β phase. By converting the entire material to the β phase, any microstructure present in the initial solid titanium material can effectively be "reset." Accordingly, in some examples the methods described herein can produce the same final microstructure regardless of what type of microstructure the titanium material had initially. In some cases, titanium parts made by additive manufacturing can have a coarse microstructure with sub-optimal properties. However, converting the titanium parts to a homogeneous β phase can reset the microstructure and allow for refining the microstructure into any of the final microstructures described herein. In some cases, it may be beneficial to only partially charge the material during hydrogen charging to produce the final microstructures only near the surface of the material.

The hold time can also depend on the kinetics of hydrogen diffusion, which may vary depending on temperature, hydrogen partial pressure, and the type of titanium alloy being processed. In some examples, the rate of diffusion of hydrogen can tend to increase with increasing temperature. However, the solubility of hydrogen in titanium alloys may also decrease with increasing temperature. Accordingly, at high temperature ranges, the solubility of hydrogen in the titanium material may be insufficient to allow for efficient hydrogen charging of the titanium material. Therefore, in some examples, the hydrogen charging stage can also include first holding the titanium material at a moderate temperature that is lower than the hydrogen charging temperature. This can "pre-charge" the titanium material with hydrogen before increasing the temperature to the hydrogen charging temperature to convert the material to $\beta$ phase. In certain examples, the titanium material can be held at a pre-charge temperature from about 500° C. to about 700° C. to pre-charge the material with hydrogen before heating the material further to a hydrogen charging temperature from about 825° C. to about 1605° C. The material can be held at the pre-charge temperature for a pre-charge time. The pre-charge time can be longer for larger and thicker titanium parts. In several examples of relatively small parts up to about 1.5 inches, the pre-charge time can be from about 5 minutes to about 24 hours, or from about 5 minutes to about 1 hour, or from about 1 hour to about 4 hours.

In further examples, the hydrogen charging stage, including optionally holding at a pre-charge temperature if desired, can last for a total of about 1 minute to about 48 hours, or from about 5 minutes to about 24 hours, or from about 5 minutes to about 1 hour, or from about 1 hour to about 8 hours, or from about 1 hour to about 4 hours. In still further examples, the hydrogen charging stage can convert the solid titanium material to a substantially homogeneous $\beta$ phase. In yet further examples, the hydrogen charging stage can raise the hydrogen content of the solid titanium material from about 0% to about 5% or greater, or from about 0% to about 10% or greater, or from about 0% to about 15% or greater, by atom percent, and in some cases up to about 25 atom %.

As a further example, the hydrogen charging stage can include holding at the pre-charge temperature for a pre-charge time under an inert gas atmosphere. Although other gases may be used, argon, helium, nitrogen or the like can be suitable. For example, an inert gas atmosphere can be introduced and the part heated up to the pre-charge temperature. Once at the pre-charge temperature the material can be held for a pre-charge time of 1 minute to about 4 hours, and in some cases 1 minute to about 30 minutes. Subsequently, the hydrogen-containing atmosphere can be introduced and held for the hydrogen charging time. As a general guideline, the pre-charge temperature and the hydrogen charging temperature can be the same, or within about 50° C. of one another. Such pre-charging can help to reduce or eliminate formation of cracks due to formation of S phase titanium.

After hydrogen charging, the titanium material can be cooled to a phase transformation temperature. This can also be performed under a hydrogen-containing atmosphere. In some examples, the hydrogen partial pressure can be the same during hydrogen charging and phase transformation. In other examples, the hydrogen partial pressure can be dynamically controlled to affect the diffusion rate of hydrogen or the hydrogen content of the titanium material. The equilibrium hydrogen concentration of titanium materials can change with temperature as well as with hydrogen partial pressure. Therefore, it may be desirable to control the hydrogen concentration as the material is cooled or heated in order to produce a more or less uniform hydrogen concentration within the sample in order to produce a more or less homogeneous microstructure after phase transformation. The phase transformation temperature can be below the $\beta$ transus temperature and above about 400° C. The titanium material can be held at the phase transformation temperature for a phase transformation time to produce $\alpha$ and/or $\alpha_2$ phase regions.

During the phase transformation stage, homogeneous precipitation of lower-temperature phases can occur in the $\beta$ phase material. In some examples, at least an $\alpha$ phase ($\alpha$ phase and/or $\alpha_2$ phase) can precipitate. At lower temperatures, the $\delta$ phase can also precipitate. In certain examples, the material can have an ultrafine-grained acicular microstructure after precipitation of these phases. In further examples, the phase transformation can form a thin layer of grain boundary $\alpha$ phase at the primary $\beta$ grain boundaries. This thin layer can, in some examples, have a thickness from 0.05 µm to 5 µm.

The phase transformation time can vary from about 1 minute to about 10 days, and in some cases 1 to 3 days, and in one example about 32 hours. The time can be in the range of a few minutes if the phase transformation temperature is high, diffusion kinetics are high, and/or the size of the titanium material sample is small (e.g. less than 1.5 inches or less than 0.5 inches). In other examples, the time can be in the range of days if the phase transformation temperature is low, diffusion kinetics are slow, or the sample is large (i.e. larger than 1.5 inches to about 4 inches in maximum diffusion length). In some examples, the phase transformation time can be sufficient to form both $\alpha$ phase and $\alpha_2$ phase. Surprisingly, these methods of refining microstructure can be effective in parts having up to about 4 inches in maximum diffusion length within reasonable times, e.g. less than 30 days. Since diffusion rates are exponential such diffusion depths were expected to require excessively long hold times for one or more stages. However, as outlined herein, this method can effectively refine microstructure up to about 4 inches using hold times of less than about 10 days, and in some cases less than 30 days for each step.

During the phase transformation stage, the titanium material can pick up additional hydrogen from the hydrogen-containing atmosphere. In some examples, the phase transformation time can be sufficient for the titanium material to reach a hydrogen content of 25% or greater, 30% or greater, 35% or greater, or 40% or greater, by atom percent.

In certain examples, the titanium material can be cooled to room temperature after holding at the phase transformation temperature for the phase transformation time. This can further alter the microstructure, such as by forming $\delta$ phase grains. In other examples, the titanium material can transition directly from the phase transformation temperature to the dehydrogenation temperature without cooling in between.

The titanium material can be dehydrogenated after the phase transformation to form the ultrafine-grained microstructure consisting of $\alpha$ and $\beta$ phases. Dehydrogenation can be accomplished by holding the titanium material at a dehydrogenation temperature under a hydrogen-free atmosphere or vacuum. In some examples, the hydrogen-free atmosphere can be argon or another inert gas. This dehydrogenation can reduce the hydrogen content to below 150 ppm in some examples. In further examples, the hydrogen content can be reduced to below 10 ppm if very pure argon or high vacuum is used. As used herein, "substantially hydrogen-free" can refer to materials with less than 150 ppm by weight hydrogen. Accordingly, the dehydrogenation stage can result in a titanium material that is substantially hydrogen-free.

The dehydrogenation temperature can be below the β transus temperature and above the δ phase decomposition temperature. In certain examples, the dehydrogenation temperature can be from about 500° C. to about 995° C. or from about 650° C. to about 750° C. The titanium material can be held at the dehydrogenation temperature for a dehydrogenation time from about 1 minute to about 10 days, in other cases from 1 to 10 days, and in some cases up to 30 days for diffusion lengths greater than 1.5 inches depending on temperature and other factors as previously discussed above with respect to the hydrogen charging stage. In further examples the dehydrogenation time can from about 5 minutes to about 24 hours, from about 5 minutes to about 1 hour, or from about 1 hour to about 4 hours. In some examples, the dehydrogenation time can be in the range of several days if the dehydrogenation temperature is low, if the titanium part is large (e.g. greater than 1.5 inches in maximum diffusion length), or if a particularly low final hydrogen concentration is desired. The dehydrogenation time can be in the range of minutes or hours if the dehydrogenation temperature is higher, if the part is small (e.g. 1.5 inches or less diffusion length), or if the final hydrogen concentration can be higher.

In certain examples, the microstructure of the titanium material can change during the dehydrogenation. In one example, the microstructure can change from an ultrafine-grained acicular microstructure to an ultrafine-grained lamellar microstructure with finely dispersed β phase grains at the triple points of lamellar α phase colonies. This microstructure can have excellent strength and ductility. In further examples, the microstructure changes during dehydrogenation can be controlled by selecting the dehydrogenation temperature. At lower dehydrogenation temperatures, such as from about 500° C. to about 650° C., the small grain size microstructure of the material can be preserved. This can result in higher strength and thinner layers of α phase at the prior β grain boundaries. On the other hand, mid-range dehydrogenation temperatures, such as from about 650° C. to about 800° C., can coarsen the microstructure. This can result in higher ductility and thicker α phase layers at the prior β grain boundaries. Additionally, in some examples using a higher dehydrogenation temperature, such as from about 825° C. to about 995° C., can result in a microstructure gradient, in which the center of the titanium part can have a coarser, more ductile microstructure and the outer surface of the part can have a stronger, finer microstructure. This can be caused by the interior of the part remaining at a higher hydrogen content while the temperature is above the β transus temperature of the titanium material with the higher hydrogen content. For example, in Ti-6Al-4V alloy, the β transus temperature of the hydrogen-free alloy can be about 995° C. and the β transus temperature can go as low as about 825° C. at higher hydrogen contents. Accordingly, when the dehydrogenation temperature is between these temperatures, the exterior surface of the alloy can give off hydrogen more quickly than the interior, so that the β transus temperature of the exterior surface rises above the dehydrogenation temperature. At the same time, the interior of the alloy can be hotter than the β transus temperature at the higher hydrogen content so that the β phase forms in the interior.

In some cases, the titanium material can be used as it is immediately after the dehydrogenation stage. As explained above, several different microstructures can be achieved by selecting appropriate dehydrogenation temperatures. In other examples, further heat treatment and/or aging can be performed after dehydrogenation.

Heat treatment, if performed, can include holding the titanium material at a heat treatment temperature under an inert atmosphere or vacuum. In some examples, the heat treatment temperature can be above about 750° C. and below the β transus temperature. In certain examples, the heat treatment temperature can be from about 750° C. to about 995° C. The titanium material can be held at this temperature for a heat treatment time from about 1 minute to about 24 hours. In some examples, the heat treatment time can be from about 5 minutes to about 4 hours, or from about 1 hour to about 4 hours, or from about 5 minutes to about 1 hour.

The increased temperature of heat treatment can cause the β grains to grow due to the higher equilibrium fraction of β phase at higher temperatures. In some examples, heating to the heat treatment temperature can also cause ultrafine-grained α colonies in the material to coalesce to form globular primary α phase, which can be driven by the high grain boundary energy in the ultrafine-grained α colonies. This microstructure can then be further adjusted by controlling the speed of cooling the titanium material after heat treatment. In one example, the titanium material can be cooled slowly to room temperature after the heat treatment. The cooling rate can be from about 1° C. per minute to about 10° C. per minute, for example. This can result in an equiaxed/globular microstructure made up of primary α grains with residual β contained at the primary α triple points.

In another example, the cooling rate can be high. For example, the titanium material can be quenched in brine, water, or oil to cool the material very rapidly. In other examples, the cooling rate can be from about 50° C. to about 50,000° C. per minute. This fast cooling can result in a bi-modal microstructure made up of primary α grains in a matrix of fine α/β that are either lamellar or acicular. Brine or water quenching can provide the highest cooling rate, which can result in α lamellae with a higher aspect ratio, while air cooling can provide a slower cooling rate that results in α lamellae with a lower aspect ratio.

In alternative examples, the heat treatment can include heating the titanium material to a temperature above the β transus. If the material is slowly cooled after this, a coarse lamellar microstructure can form with lower aspect ratio α grains. Cooling quickly after this heating can form thinner α grains with a higher aspect ratio.

The methods of refining microstructures of titanium materials can also include aging the titanium material by holding the titanium material at an aging temperature from about 400° C. to about 650° C. under an inert atmosphere or vacuum. During aging, secondary α and αs grains can precipitate to increase the strength of the material. The temperature and time used for aging can depend on the particular titanium alloy and the desired level of strengthening. Greater strengthening can be achieved by holding the material at lower temperatures for longer times, such as temperatures from about 400° C. to about 500° C. for times of about 1 day to about 10 days. This strengthening can also result in the loss of some ductility. In other examples, moderate strengthening can be achieved at higher temperatures, such as from about 500° C. to about 650° C., with less loss of ductility. At these higher temperatures, diffusion can be faster and therefore the aging time can be shorter. In some examples, the aging time can be from about 1 minute to about 24 hours, from about 5 minutes to about 12 hours, or from about 2 hours to about 12 hours.

In any of the above embodiments, the process can be void of mechanical processing steps after hydrogen charging. As used herein, the term "mechanical processing steps" refers to forging, rolling, extrusion, drawing, swaging, and the like as known in the art. Mechanical processing steps are those steps where the material is deliberately deformed plastically at either elevated (hot working) or room temperatures (cold working). In a conventional process including mechanical processing steps, after the plastic deformation of cold working, or during hot working the microstructure of the material can be transformed at elevated temperatures via recrystallization to achieve a desired microstructure. However, by using the processes of the present invention, strong titanium materials with fine microstructures can be produced without the need for further mechanical processing steps after thermo-hydrogen refinement.

The present disclosure also extends to the titanium materials produced using the methods described above. In some examples, the methods described above can produce unique microstructures not obtainable by other methods. The methods described herein can transform a material with a coarse grained α+β titanium microstructure to an ultrafine-grained lamellar, globular, or bi-modal microstructure that contains discontinuous β phase without any thermomechanical processing.

In some examples, the titanium metal or titanium metal alloys obtained from the process can have a fine or ultrafine grain size (i.e. average grain size). Such ultrafine grain sizes on the microscopic scale provide for high strength and ductility in the macro scale materials. In any of the above embodiments, the titanium metal or the titanium metal alloy obtained from the process can have an α grain size of less than 100 μm. In some embodiments, the titanium metal or titanium metal alloy prepared using the above process can have a grain size of less than 10 μm. In some embodiments, the titanium metal or titanium metal alloy prepared using the above process can have a grain size of less than 20 μm and in some cases less 5 μm. In other embodiments, the titanium metal or the titanium metal alloy can have a grain size of from about 10 nm to about 10 μm. In other embodiments, the titanium metal or the titanium metal alloy can have a grain size from about 10 μm to about 100 μm. These grain sizes and other properties recited herein can be obtained directly from the process without further post-processing.

Figure 4:
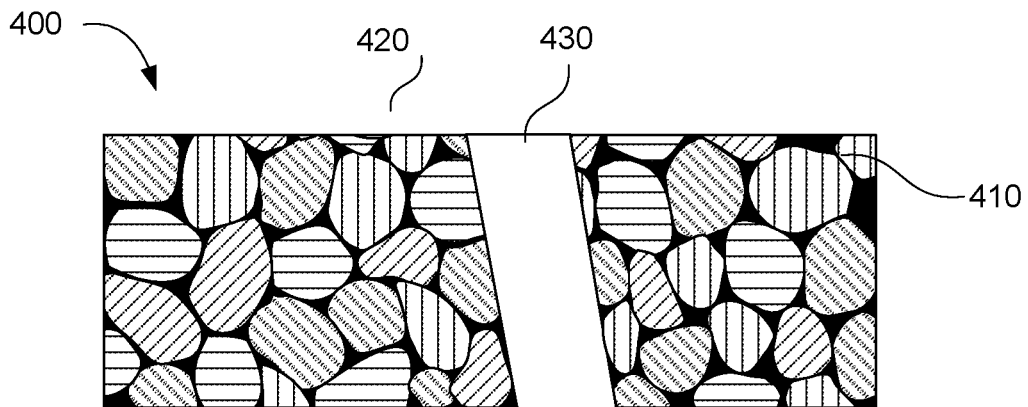
FIG. 4 is a cross-sectional view of a microstructure of an example titanium material produced using the present methods.

FIG. 4 shows the microstructure of one example titanium material 400 that can be produced using the methods described herein. This microstructure can be made by cooling the material immediately following the dehydrogenation stage. The microstructure includes lamellar α phase colonies 410 with β grains 420 dispersed between the α colonies. Grain boundary α 430 forms at boundaries of prior β grains (i.e. β grains formed during hydrogen charging and β anneal/reset).

Figure 5:
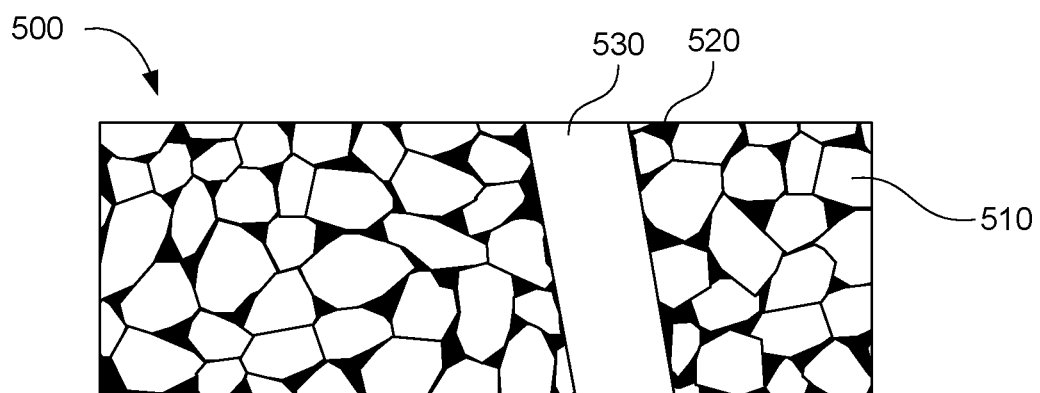
FIG. 5 is a cross-sectional view of a microstructure of another example titanium material produced using the present methods.

FIG. 5 shows another example microstructure of a titanium material 500. This microstructure can be made by heat treating the material and then cooling slowly, at a rate of 10° C. per minute or slower. The microstructure includes globularized primary α grains 510 and β grains 520. As with FIG. 4, grain boundary α 530 forms at boundaries of prior β grains.

Figure 6:
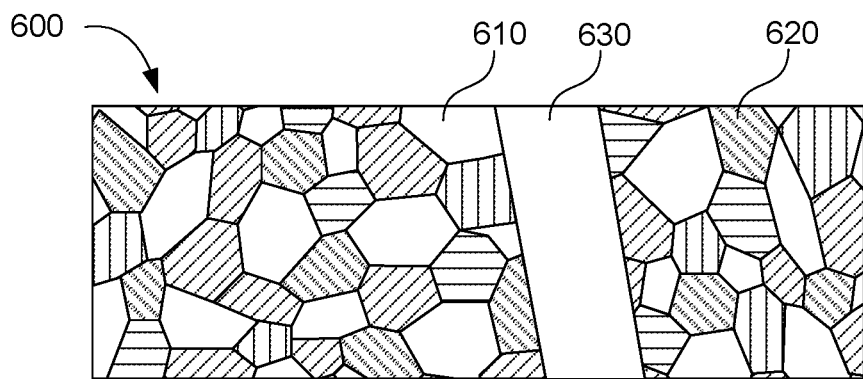
FIG. 6 is a cross-sectional view of a microstructure of another example titanium material produced using the present methods.

FIG. 6 shows yet another example microstructure of a titanium material 600. This microstructure can result from quickly cooling the material after heat treating. The microstructure includes primary α grains 610 in a matrix of fine α/β lamellae 620. Once again, grain boundary α 630 forms at boundaries of prior β grains.

In further examples, the microstructures produced using the methods described herein can be described in more detail by measuring the length and width of the various phase grains in the microstructures. In one example, a titanium material can be made by treating Ti-6Al-4V alloy using the hydrogen charging, phase transformation, and dehydrogenation processes described above. The final microstructure of the material can have the following characteristics shown in Table 1.

TABLE 1

| Feature | Average Minimum (μm) | Average Maximum (μm) |
| --- | --- | --- |
| α lathe length | 5 | 8 |
| α lathe width | 0.1 | 2 |
| α colony length | 5 | 8 |
| α colony width | 1 | 4 |
| GB α thickness | 2 | 6 |
| β length | 0.5 | 3 |
| β width | 0.4 | 0.5 |
| Prior β diameter | 50 | >1000 |

In another example, a Ti-6Al-4V alloy can be treated by the hydrogen charging, phase transformation, dehydrogenation, and heat treatment processes described above. This microstructure can have the characteristics shown in Table 2.

TABLE 2

| Feature | Average Minimum (μm) | Average Maximum (μm) |
| --- | --- | --- |
| $α_p$ length | 5 | 10 |
| $α_p$ width | 5 | 10 |
| α lathe length | 5 | 10 |
| α lathe width | <1 | <1 |
| α colony length | 5 | 10 |
| α colony width | 1 | 4 |
| GB α thickness | 1 | 6 |

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method of refining a microstructure of a titanium material, comprising:
    providing a solid titanium material at a temperature below about 400° C.;
    heating the titanium material under an inert gas atmosphere to a pre-charge temperature for a pre-charge time to form a heated titanium material;
    exposing the heated titanium material under a hydrogen-containing atmosphere to a hydrogen charging temperature above a β transus temperature of the titanium material and below a melting temperature of the titanium material, and holding for a hydrogen charging time sufficient to convert the titanium material to a substantially homogeneous β phase titanium material;
    cooling the β phase titanium material under the hydrogen-containing atmosphere to a phase transformation temperature below the β transus temperature and above about 400° C., and holding at the phase transformation temperature for a phase transformation time to produce a transformed titanium material having a phase regions; and holding the transformed titanium material under a substantially hydrogen-free atmosphere or vacuum at a dehydrogenation temperature below the β transus temperature and above about δ phase decomposition temperature for a dehydrogenation time, to remove hydrogen from the transformed titanium material to form a dehydrogenated titanium material.

2. The method of claim 1, wherein the titanium material has a maximum diffusion length of greater than 1.5 inches to about 4 inches.

3. The method of claim 1, wherein the pre-charge temperature is within 50° C. of the hydrogen charging temperature.

4. The method of claim 1, wherein the inert gas is argon or helium.

5. The method of claim 2, wherein the hydrogen charging temperature is from about 825° C. to about 1605° C. and the hydrogen charging time is from about 1 day to 10 days.

6. The method of claim 2, wherein the phase transformation temperature is from about 400° C. to about 825° C. and the phase transformation time is from about 1 day to 10 days.

7. The method of claim 2, wherein the dehydrogenation temperature is from about 200° C. to about 995° C. and the dehydrogenation time is 1 day to 10 days.

8. The method of claim 1, wherein the hydrogen-containing atmosphere consists of pure hydrogen or a mixture of hydrogen and inert gas wherein a partial pressure of hydrogen is from about 0.5 atm to about 1 atm.

9. The method of claim 1, further comprising heat treating the dehydrogenated titanium material after removing the hydrogen by holding the dehydrogenated titanium material at a heat treatment temperature above about 750° C. and below the β transus temperature of the titanium material under an inert atmosphere or vacuum to form a heat treated titanium material.

10. The method of claim 9, wherein the heat treatment temperature is from about 750° C. to about 995° C.

11. The method of 9, further comprising aging the heat treated titanium material after the heat treatment by holding the heat treated titanium material at an aging temperature from about 400° C. to about 700° C. for at least about 2 hours under an inert atmosphere or vacuum to form an aged titanium material.

12. The method of claim 1, wherein the solid titanium material is a sintered material having a density from about 96% to about 100%.

13. The method of claim 1, wherein the solid titanium material comprises commercially pure titanium, Ti-6Al-4V alloy, or a combination thereof.

14. A titanium material having an ultrafine-grained or fine-grained microstructure, comprising α colonies or globular $α_p$ grains with diameters 10 to greater than 200 times smaller than prior β grains they were formed from, fine and discontinuous β grains after refinement at the triple points of the α colonies and $α_p$ grains, and grain boundary α found at prior β grain boundaries with a thickness that is within 50% of an average diameter of the α colonies or $α_p$ grains, and wherein the titanium material has a maximum diffusion length greater than 1.5 inches.

* * * * *